(12) United States Patent
Usrey et al.

(10) Patent No.: US 8,486,569 B2
(45) Date of Patent: Jul. 16, 2013

(54) LITHIUM/CARBON MONOFLUORIDE BATTERIES WITH ORGANOSILICON ELECTROLYTES

(75) Inventors: Monica L. Usrey, Madison, WI (US); Xin Chen, Madison, WI (US); Jose A. Pena Hueso, Madison, WI (US); Robert C. West, Madison, WI (US); Robert J. Hamers, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 541 days.

(21) Appl. No.: 12/776,922

(22) Filed: May 10, 2010

(65) Prior Publication Data

US 2011/0274985 A1    Nov. 10, 2011

(51) Int. Cl.
*H01M 6/16* (2006.01)
(52) U.S. Cl.
USPC ............... 429/324; 429/231.95; 429/326
(58) Field of Classification Search
USPC .................... 429/324, 231.95, 326
See application file for complete search history.

(56) References Cited

U.S. PATENT DOCUMENTS

| | | | |
|---|---|---|---|
| 3,773,558 | A | 11/1973 | Charbonnier et al. |
| 2003/0124432 | A1 | 7/2003 | Miura et al. |
| 2004/0197665 | A1 | 10/2004 | Amine et al. |
| 2007/0065728 | A1 | 3/2007 | Zhang et al. |
| 2007/0076349 | A1 | 4/2007 | Dementiev et al. |
| 2008/0273290 | A1 | 11/2008 | Dementiev et al. |
| 2009/0088583 | A1 | 4/2009 | West et al. |
| 2009/0111029 | A1 | 4/2009 | Lee et al. |

OTHER PUBLICATIONS 11 pages of an ISR from corresponding PCT application PCT/US2011/030422 dated Jun. 27, 2011.
J. Pilarzyk, Lithium Carbon Monofluoride Coin Cells in Real-Time Clock and Memory Backup Applications, White Paper, Rayovac web site, undated admitted prior art.
K. Amine et al., Novel Silane Compounds As Electrolyte Solvents for Li-Ion Batteries, 8 Electrochemistry Communications 429-433 (2006).
N. Rossi et al., Improving Properties of Silicon-Containing Oligo(ethylene oxide) Electrolytes With Cyclic Carbonate Additives, 92 PMSE Preprints 426-427 (2005).
Z. Zhang et al., Highly Conductive Oligoethyleneoxy-Functionalized Silanes, 46 Polym. Prepar. 662-663 (2005).
V. Phung et al., Synthesis of Inorganic Squid Type Molecules, 472 Zeitschrift Fuer Anorganische Und Allgemeine Chemie 75-82 (1981).
L. Zhang et al., Highly Conductive Trimethylsilyl Oligo(ethylene oxide) Electrolytes for Energy Storage Applications, 18 Journal of Materials Chemistry 3713-3717 (2008).
B. Leska et al., Generation and Stability of N-phenacyl-4-R-pyridinium Ylides in Silicon Polypodands, 700 Pol. Journal of Molecular Structure 169-173 (2004).
H. Nakahara et al., Passive Film Formation on a Graphite Electrode: Effect of Siloxane Structures, 160 Journal of Power Sources 548-557 (2006).
Z. Zhang et al., Oligo(ethylene glycol)-functionalized Disiloxane: Synthesis and Conductivity, 92 PMSE Preprints 365-366 (2005).
G. Nagasubrammanian, Fabrication and Testing Capabilities for 18650 Li/(CFX)n Cells, 2 Int. J. Electrochem. Sci. 913-922 (2007).
G. Nagasubramanian et al., A New Chemical Approach to Improving Discharge Capacity of Li/(CFX)n Cells, 165 Journal of Power Sources 630-634 (2007).

*Primary Examiner* — Edward Cain
(74) *Attorney, Agent, or Firm* — Quarles & Brady LLP

(57) ABSTRACT

Disclosed are lithium/carbon monofluoride batteries suitable for long term use at highly elevated temperatures. Organosilicon electrolytes having low vapor pressure and high flash points are used, along with lithium salts and ceramic separators. Methods of using these batteries at high temperatures are also disclosed.

14 Claims, 4 Drawing Sheets

LITHIUM/CARBON MONOFLUORIDE BATTERIES WITH ORGANOSILICON ELECTROLYTES

STATEMENT REGARDING FEDERALLY SPONSORED RESEARCH/DEVELOPMENT

This invention was made with United States government support awarded by the following agencies: NSF0724-469. The United States government has certain rights in this invention.

CROSS-REFERENCE TO RELATED APPLICATIONS

Not applicable.

BACKGROUND OF THE INVENTION

The present invention relates to batteries. More particularly, it relates to organosilicon electrolytes used in combination with lithium anode/carbon monofluoride cathode batteries in structures where the battery is operable at highly elevated temperatures.

In developing optimal batteries one needs to take into account a variety of considerations. Typically, one will want to provide high voltage, store substantial amounts of energy, operate reliably and safely, provide energy on a timely response basis, keep the cost of the battery materials within commercially practical limits, provide a battery that operates long term without significant maintenance issues, and also keep the weight of the battery low.

A particularly promising type of battery for many applications is one where the anode is a lithium metal anode and the cathode is primarily made of carbon monofluoride. "Carbon monofluoride", which is often abbreviated as "$CF_x$", is typically formed by a carbon substrate (such as graphite powder) having been exposed to fluorine gas at high temperature. This creates a material where fluorine is intermixed with carbon at a molar ratio near 1 to 1, but usually not exactly at 1 to 1. These materials often range from $CF_{0.68}$ to $CF_{1.12}$, yet still are collectively referred to as "monofluoride". That nomenclature will be used herein as well.

FIG. 1 depicts a prior art type of battery, of the coin cell/button type. It has a disk form cathode 12, an anode 13, a metal current collector 14 attached along a side of the cathode 12, and a separator 15 impregnated with (and adjacent) electrolyte 16. There may also be metal spacers 17, a spring 18, a gasket 19, and outer casings 20 and 21. For example, the separator could be polyethylene impregnated with a mixture of polypropylene carbonate, 1,2 dimethoxyethane, and lithium tetrafluoroborate salt.

While this type of prior art device is useful for a variety of applications, it is not well suited for long term use at temperatures above 100° C. This is significant as there are various industrial and military applications for batteries which would benefit if the batteries were operable at higher temperatures (without significantly compromising other performance characteristics).

For example, in a number of oil drilling applications various battery powered devices (e.g. cameras; sensors) are used at or near the bottom of the drilled area. This can expose the device to geothermal heating extremes.

As another example, in a battlefield environment military devices can become exposed to heat generated by explosions. It is desirable for those devices (e.g. their power sources) to have improved survivability in the face of such heat exposure.

The literature has described a variety of organosilicon based electrolytes and methods for producing them. This has in some cases included a discussion of mixing those electrolytes with lithium salts for improved performance. See e.g.:

(a) $1S_1M3$: $Me_3Si—CH_2O—(CH_2CH_2O)_3$-Me: K. Amine et al., Novel Silane Compounds As Electrolyte Solvents For Li-Ion Batteries, 8 Electrochemistry Communications 429-433 (2006); N. Rossi et al., Improving Properties Of Silicon-Containing Oligo(ethylene oxide) Electrolytes With Cyclic Carbonate Additives, 92 PMSE Preprints 426-427 (2005).

(b) 1NM3: $Me_3Si—O—(CH_2CH_2O)_3$-Me: Z. Zhang et al., Highly Conductive Oligoethyleneoxy-Functionalized Silanes, 46 Polym. Prepar. 662-663 (2005).

(c) $2NM_23$: $Me_3Si—O—(CH_2CH_2O)_3—SiMe_3$: V. Phung et al., Synthesis Of Inorganic Squid Type Molecules, 472 Zeitschrift Fuer Anorganische Und Allgemeine Chemie 75-82 (1981); L. Zhang et al., Highly Conductive Trimethylsilyl Oligo(ethylene oxide) Electrolytes For Energy Storage Applications, 18 Journal Of Materials Chemistry 3713-3717 (2008).

(d) $2NM_24$: $Me_3Si—O—(CH_2CH_2O)_4—SiMe_3$: V. Phung et al., and L. Zhang et al., supra.

(e) 1ND3: $Me—O—(CH_2CH_2O)_3—Si—O—(CH_2CH_2O)_3$-Me: K. Amine et al. and N. Rossi et al., supra, as well as B. Leska et al., Generation And Stability Of N-phenacyl-4-R-pyridinium Ylides In Silicon Polypodands, 700 Pol. Journal Of Molecular Structure 169-173 (2004).

(f) 1ND4: $Me—O—(CH_2CH_2O)_4—Si—O—(CH_2CH_2O)_4$-Me: K. Amine et al., N. Rossi et al., and B. Leska et al., supra.

(g) 2ND3 $Me-O—(CH_2CH_2O)_3—Si\ (CH_3)_2—O—Si(CH_3)_2—(CH_2CH_2O)_3$-Me: H. Nakahara et al., Passive Film Formation On A Graphite Electrode Effect Of Siloxane Structures, 160 Journal Of Power Sources 548-557 (2006); Z. Zhang et al., Oligo(ethylene glycol)-functionalized Disiloxane: Synthesis And Conductivity, 92 PMSE Preprints 365-366 (2005); and U.S. patent application publication 2007/065728.

However, to date, we are unaware of any prior suggestion to use such organosilicon based electrolytes in carbon monofluoride/lithium type batteries, much less what the attributes of such organosilicons should preferably be for such purposes, or other modifications to the batteries to enable high temperature operation.

In unrelated work there has been discussion of the use of ceramics such as alumina in separator materials in a battery system, albeit there have been indications of expected difficulties in using that material at various temperatures. See e.g. U.S. Pat. No. 3,773,558.

Hence, there is a need for improved lithium/carbon monofluoride batteries, particularly with respect to capabilities for high temperature operation.

SUMMARY OF THE INVENTION

In one aspect the invention provides a battery suitable to deliver stored energy at above 130° C. (preferably at above 150° C.) for a period of greater than five hours. There is a cathode comprising carbon monofluoride, an anode comprising lithium metal, a separator, and an electrolyte. The electrolyte is primarily an organosilicon compound having a flash point above 180° C. and a vapor pressure below 2 torr at 25° C. For this purpose flash point has been defined using the test of ASTM D3828-09.

In one preferred form the organosilicon compound includes the following moiety:

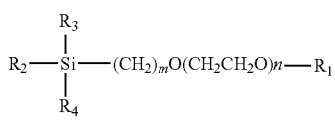

wherein $R_1$ is selected from the group consisting of alkyl moieties of less than five carbons, and

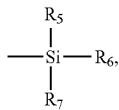

wherein $R_5$, $R_6$ and $R_7$ are the same or different, and each is selected from the group consisting of alkyl moieties of less than five carbons;

wherein $R_2$, $R_3$ and $R_4$ are the same or different, and each is selected from the group consisting of alkyl moieties of less than five carbons and $R_8$—$O(CH_2CH_2O)_r$—, where $R_8$ is selected from the group consisting of alkyl moieties of less than five carbons;

wherein m is equal to or higher than 0 and lower than 11; and wherein r and n are the same or different and equal to or higher than 1 and lower than 10.

In another preferred form the organosilicon compound includes the following moiety:

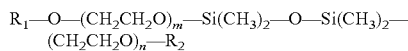

wherein $R_1$ and $R_2$ are the same or different and selected from the group consisting of alkyl moieties of less than five carbons; and wherein m and n are the same or different and equal to or higher than 1 and lower than 10.

In other aspects the separator is not made of a plastic material (e.g. it is made of a ceramic, highly preferably made of alumina), the electrolyte is a liquid, the electrolyte further comprises a salt such as a lithium salt is selected from the group consisting of lithium-tetrafluoroborate, lithium hexafluorophosphate, lithium-bis(trifluoromethyl-sulfonyl) imide, and lithium bis-(oxalatoborate). Most preferably the salt is lithium bis-(oxalatoborate).

The cathode may include a metallic current collector that has been bonded to a mixture of carbon monofluoride, a polyvinylidene fluoride binder, and acetylene black conductivity aid (e.g. by drop drying the mixture on the collector).

In another aspect the invention provides methods of using such batteries to deliver stored energy. After obtaining a battery of the above type (with energy stored therein), one exposes the battery to a temperature above 130° C. (preferably above 150° C.) and delivers stored energy from the battery at that temperature more than five hours.

From the present disclosure it will be appreciated that one can generate electricity using a conventional energy source, use that electricity to charge a battery of the present invention, and then use a battery of the present invention at highly elevated temperatures. Batteries of the present invention can be produced at acceptable cost, can store significant quantities of energy and deliver that energy in a responsive manner, and be reliable for long term use.

The above and still other advantages of the present invention will be apparent from the description that follows. It should be appreciated that the following description is merely of preferred embodiments of the invention. The claims should therefore be looked to in order to understand the full claimed scope of the invention.

DESCRIPTION OF THE PREFERRED EMBODIMENTS

Our carbon monofluoride/lithium batteries are useful for a variety of specialized applications. For example, they can be used in military applications where heat resistance is important (e.g. battlefield related equipment such as radio communication devices, GPS, thermal imaging equipment). They can also be used in a variety of industrial applications, again where heat resistance is important (e.g. oil field services).

They are very lightweight (due to high energy density), thus retaining a highly desirable property of conventional carbon monofluoride/lithium batteries. Further, they have a very constant discharge voltage until essentially the end of their useful life.

Figure 1:
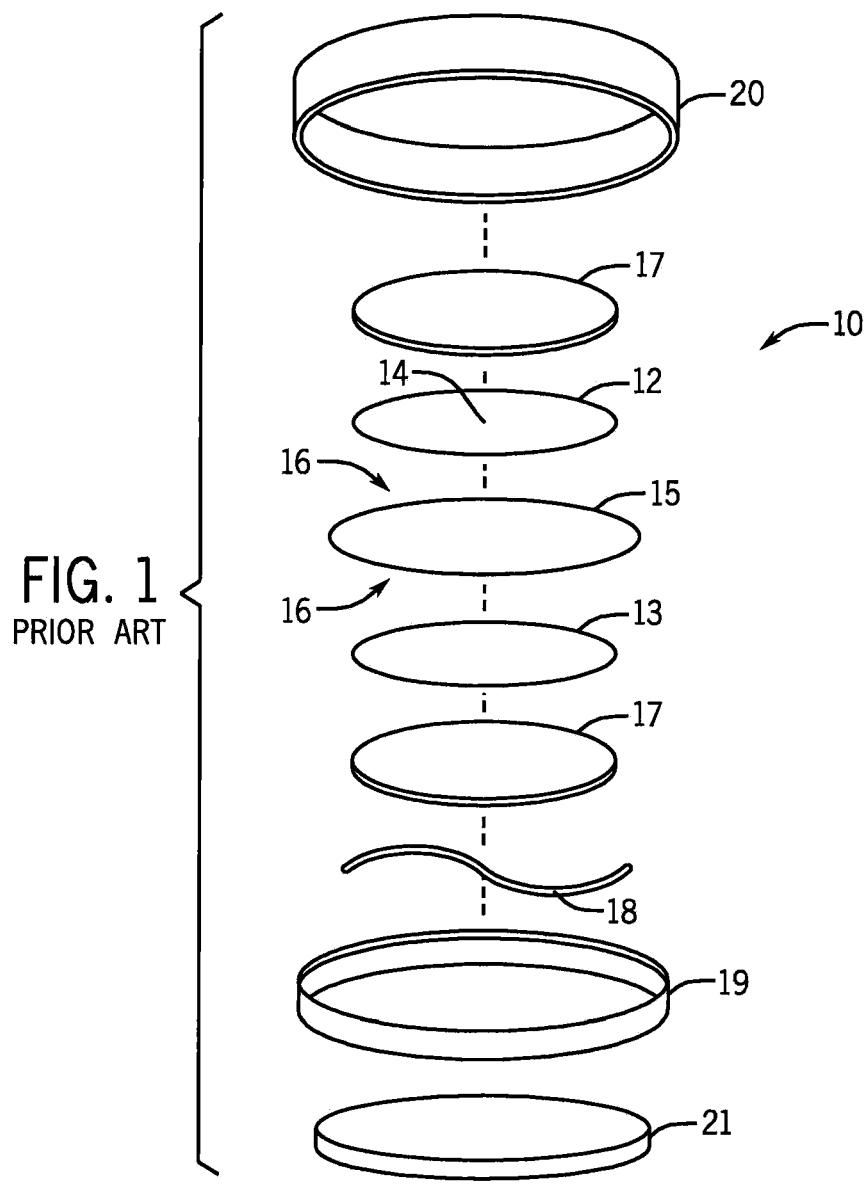
FIG. 1 is a schematic exploded view of a prior art type of lithium/carbon monofluoride battery.

The preferred electrolytes of the present invention can be used with a wide variety of lithium/carbon monofluoride battery constructions. As one example, a FIG. 1 device can have its standard electrolyte replaced with an organosilicon/lithium salt electrolyte of the present invention, and most preferably its plastic (polyethylene) separator replaced with an alumina or other ceramic separator. Further, we prefer to use ceramic type screws to hold the device together and a silicone o-ring for the seal.

One could, for example, make the outer housing 20/21 of a 2032 stainless steel. The stainless steel current collector 14 could be a single ring at 1.5 cm diameter.

The separator 15 could be surfactant-coated polypropylene (Celgard 3400, available from Celgard LLC) when operating at some temperatures. Such a separator could have a 25 μM thickness.

However, as the operating temperature increases to 130° C. or more we have discovered significant operational advantages when the separator is ceramic. Most preferred is an alumina filter membrane, such as the Anopore Inorganic Membrane from Whatman, having a 13 mm diameter and a 0.02 micron pore size.

The anode 13 could be pure lithium metal punched to a 13.5 mm diameter circle. The lithium metal used is electrochemical grade (Lectro Max 100, Batch #1385) from FMC Lithium. The metal is stored at all times in an argon glove box with water content less than 5 ppm.

The cathode 12 could be a composite material of 90% carbon monofluoride (Advance Research Chemical, CAS#51311-17-2), 5% polyvinylidene fluoride (PVDF, Sigma Aldrich, $M_w$~180,000), and 5% acetylene black (Alfa Aesar), by mass. The carbon monofluoride acts as the cathode's active material, the PVDF serves as a binder, and the carbon black is an additive to increase the electronic conductivity of the composite.

To form this cathode, PVDF is dissolved in N-methyl-2-pyrrolidone (NMP, Sigma Aldrich) solvent at 40° C. in four hours of mixing to achieve roughly 0.04 g/ml. The carbon black and carbon monofluoride material is added, mixed well (via vortex and bath sonication for thirty minutes). After all ingredients are added the mixture is bath sonicated for 90 minutes.

200 µl of the resulting slurry is then drop-dried onto 1.5 cm diameter steel or nickel current collectors and allowed to dry overnight at 70° C. See also G. Nagasubramanian, Fabrication And Testing Capabilities For 18650 Li/($CF_x$)$_n$ Cells, 2 Int. J. Electrochem. 913-922 (2007).

We then select an organosilicon electrolyte. Highly preferred are organosilicon electrolytes which are liquid, with high temperature stability, such as 1NM3, $2NM_2$3, and $2NM_2$4.

We mix the organosilicon material with a salt (e.g. over a period of 4 to 24 hours), such as a lithium salt, such as using about 1M lithium salt. A particularly desirable lithium salt is LiTSFI (lithium-bis(trifluoromethyl-sulfonyl)imide), this salt being available from Sigma Aldrich.

Figure 2:
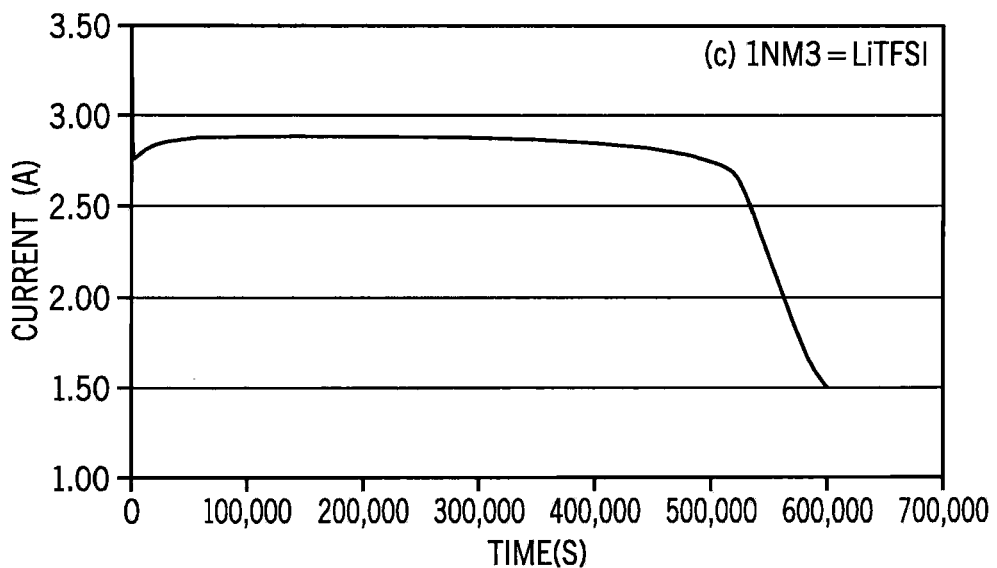
FIG. 2 is a graph showing voltage delivery characteristics of a first battery of the present invention, when operated at 130° C.
Figure 3:
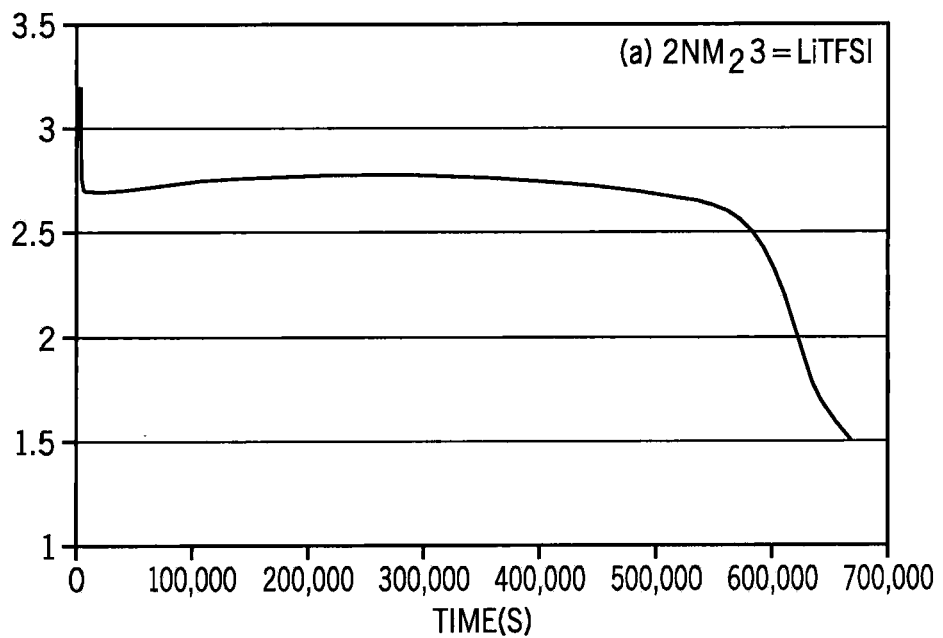
FIG. 3 is a graph showing voltage delivery characteristics of a second battery of the present invention, when operated at 130° C.

In some tests of our batteries we charged at 0.1 mA until 3.2V functionality was reached. The batteries were then discharged at –0.1 mA until 1.5 V functionality was reached. This was tested at varying temperatures between 55° C. to about 150° C. FIGS. 2-6 depict the test results. In these five cases we used LiTFSI as the salt. The organosilicon compound was as indicated in FIGS. 2 and 3. For FIGS. 4-6 it was $2NM_2$4.

Figure 4:
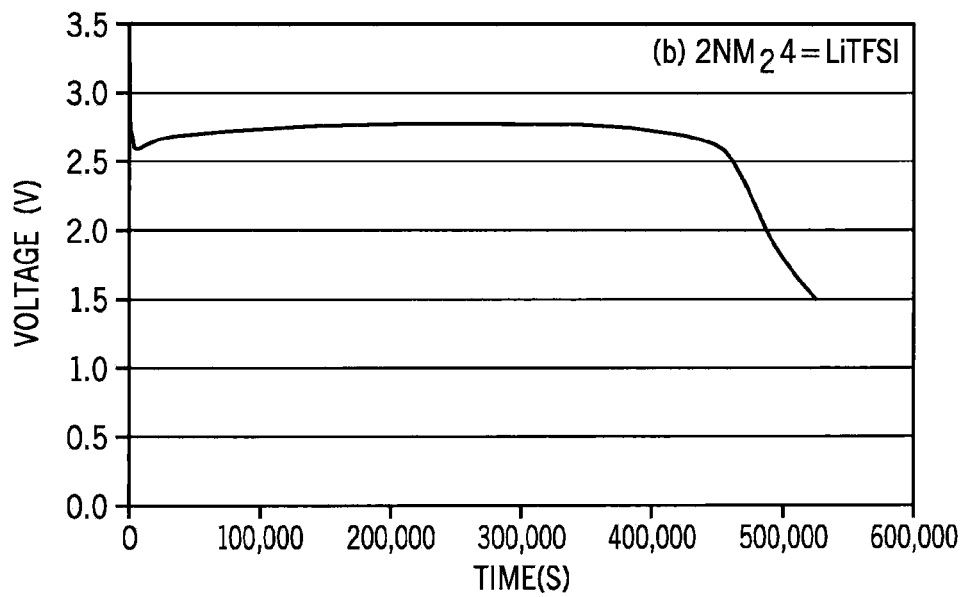
FIG. 4 is a graph showing voltage delivery characteristics of a third battery of the present invention, when operated at 130° C.
Figure 5:
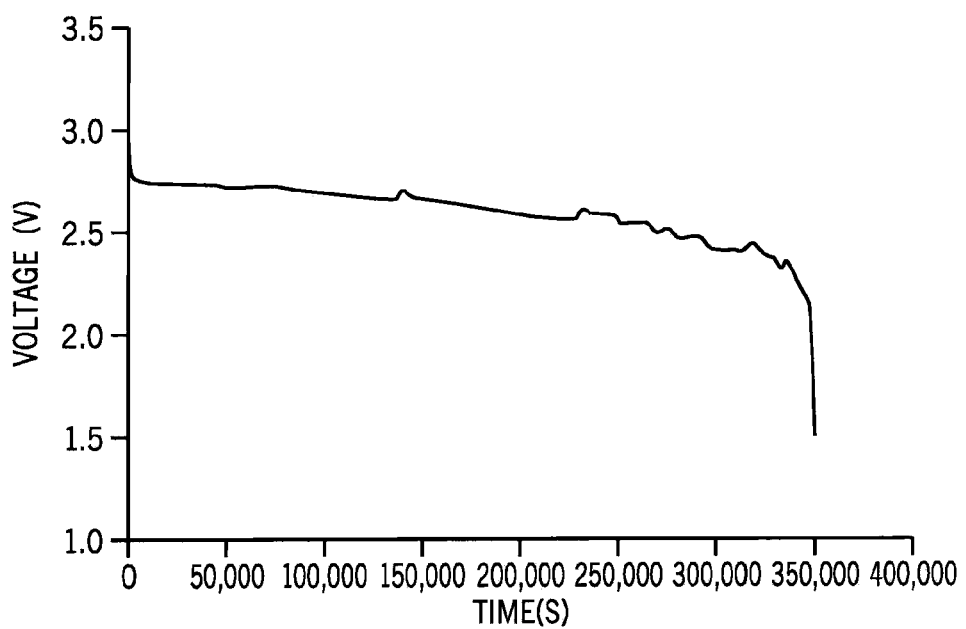
FIG. 5 is a graph showing voltage delivery characteristics of a fourth battery of the present invention, using a ceramic separator, when operated at 150° C.
Figure 6:
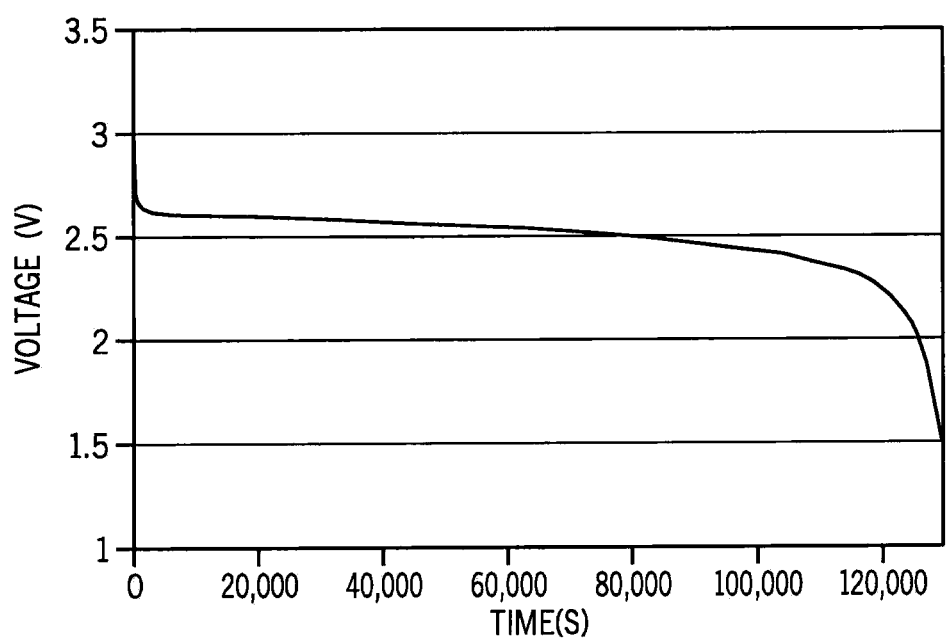
FIG. 6 is a graph similar to FIG. 5, using a similar battery except where the separator is a plastic separator, when operated at 150° C.

It should be particularly noted that FIGS. 5 and 6 compare operability of a FIG. 4 type system, but at 150° C., with FIG. 5 using a ceramic separator and FIG. 6 using a plastic separator. Surprisingly, the FIG. 6 battery had nearly three times the capacity of the FIG. 6 battery, with all other factors being equal, when operated at this temperature with the same electrolyte.

While a number of embodiments of the present invention have been described above, the present invention is not limited to just these disclosed examples. There are other modifications that are meant to be within the scope of the invention and claims. Thus, the claims should be looked to in order to judge the full scope of the invention.

INDUSTRIAL APPLICABILITY

The present invention provides improved batteries capable of high temperature operation, without materially compromising other desired characteristics of lithium/carbon monofluoride batteries.

What is claimed is:

1. A battery suitable to deliver stored energy at above 130° C. for a period of greater than five hours, comprising:
    a cathode comprising carbon monofluoride;
    an anode comprising lithium metal;
    a separator; and
    an electrolyte which comprises an organosilicon compound selected from the group consisting of:

(a) $Me_3Si$—O—$(CH_2CH_2O)_3$-Me; and
(b)

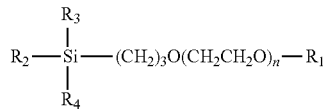

wherein $R_1$ is selected from the group consisting of alkyl moieties of less than five carbons, and

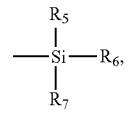

wherein $R_5$, $R_6$ and $R_7$ are the same or different, and each is selected from the group consisting of alkyl moieties of less than five carbons;

wherein $R_2$, $R_3$ and $R_4$ are the same or different, and each is selected from the group consisting of alkyl moieties of less than five carbons and $R_8$—$O(CH_2CH_2O)_r$—, where $R_8$ is selected from the group consisting of alkyl moieties of less than five carbons;

wherein n is 2 or 3; and wherein r is equal to or higher than 1 and lower than 10.

2. The battery of claim 1, wherein the separator comprises alumina.

3. A method of using a battery to deliver energy, comprising:
    obtaining a battery comprising:
        a cathode comprising carbon monofluoride;
        an anode comprising lithium metal;
        a separator comprising a ceramic material; and
        an electrolyte comprising an organosilicon compound having a flash point above 180° C. and a vapor pressure below 2 torr at 25° C.; and
    exposing the battery to a temperature at or above 150° C. and delivering stored energy from the battery at that temperature for a period of at least five hours.

4. The method of claim 3, wherein the organosilicon compound comprises the following moiety:

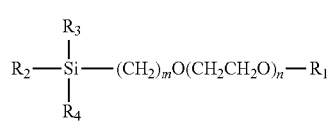

wherein $R_1$ is selected from the group consisting of alkyl moieties of less than five carbons, and

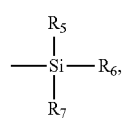

wherein $R_5$, $R_6$ and $R_7$ are the same or different, and each is selected from the group consisting of alkyl moieties of less than five carbons;

wherein $R_2$, $R_3$ and $R_4$ are the same or different, and each is selected from the group consisting of alkyl moieties of less than five carbons and $R_8$—$O(CH_2CH_2O)_r$—, where $R_8$ is selected from the group consisting of alkyl moieties of less than five carbons;

wherein m is equal to or higher than 0 and lower than 11; and wherein r and n are the same or different and equal to or higher than 1 and lower than 10.

5. The method of claim 3, wherein the separator is not made of a plastic material.

6. The method of claim 5, wherein the separator comprises a ceramic material.

7. The method of claim 3, wherein the battery is suitable to deliver stored energy at above 150° C. for a period of greater than five hours.

8. The method of claim 3, wherein the electrolyte is a liquid and further comprises a salt.

9. The method of claim 8, wherein the salt is a lithium salt.

10. The method of claim 9, wherein the lithium salt is selected from the group consisting of lithium-tetrafluoroborate, lithium hexafluorophosphate, lithium-bis(trifluoromethyl-sulfonyl)imide, and lithium bis-(oxalatoborate).

11. The method of claim 10, wherein the lithium salt is lithium bis-(oxalatoborate).

12. The method of claim 3, wherein the cathode further comprises a metallic current collector, where the metallic current collector is bonded to a mixture of carbon monofluoride, a polyvinylidene fluoride binder, and acetylene black conductivity aid by drop drying the mixture on the collector.

13. A method of using a battery to deliver energy, comprising:

obtaining a battery comprising:
- a cathode comprising carbon monofluoride;
- an anode comprising lithium metal;
- a separator comprising a ceramic material; and
- an electrolyte comprising an organosilicon compound having a flash point above 180° C. and a vapor pressure below 2 torr at 25° C.; and exposing the battery to a temperature at or above 130° C. and delivering stored energy from the battery at that temperature.

14. The method of claim 13, wherein the exposing step comprises exposing the battery to a temperature at or above 130° C. and delivering stored energy from the battery at that temperature for a period of at least five hours.

* * * * *